United States Patent [19]

Gentzel, Jr.

[11] 4,368,908

[45] Jan. 18, 1983

[54] VACUUM HANDLING FIXTURE

[75] Inventor: Alfred F. Gentzel, Jr., Bridgewater, N.J.

[73] Assignee: Burroughs Corporation, Detroit, Mich.

[21] Appl. No.: 214,236

[22] Filed: Dec. 8, 1980

[51] Int. Cl.³ .............................................. B66C 1/02
[52] U.S. Cl. .................................................. 294/64 R
[58] Field of Search .............. 294/64 R, 65, 64 A; 269/21; 248/363; 271/108, 232, 258, 259

[56] References Cited

U.S. PATENT DOCUMENTS 3,472,356  10/1969  Reppert .............................. 294/64 R
3,843,183  10/1974  Hutson ............................... 294/64 R
4,185,814  1/1980  Bachmann et al. ................. 294/64 R Primary Examiner—James B. Marbert
Attorney, Agent, or Firm—Kevin R. Peterson; Robert A. Green; David G. Rasmussen

[57] ABSTRACT

The disclosure is of a vacuum fixture comprising a pair of plates having a vacuum space between them and with a plurality of suction holes in one plate providing communication between said vacuum space and the outside world. A handle is secured to the plates, and the handle includes tubing coupled to the vacuum space and a control valve for applying suction force to the vacuum space and to a sheet or body supported on the one plate and held down thereon by the suction force.

7 Claims, 3 Drawing Figures

VACUUM HANDLING FIXTURE

BACKGROUND OF THE INVENTION

A recently developed display panel includes an electrode made up of two thin metal sheets which are welded together before the panel is assembled. The metal sheets are held together on a suitable support fixture, and they are welded together at several locations.

In performing these operations, it is necessary to handle each of the metal sheets and mount them on the welding apparatus and then transport them from the welding apparatus to other processing stations. The metal sheets are thin and very flexible and difficult to handle, and no apparatus is presently known for holding such sheets, transporting them, and performing the required operations thereon safely and easily.

The present invention solves this problem by means of a fixture which includes vacuum means, by means of which the fixture can readily hold each metal sheet and transfer it to welding apparatus. The apparatus can also support the assembly of the two metal sheets after they have been welded together so that they can be transported to other work stations.

DESCRIPTION OF THE INVENTION

Figure 1:
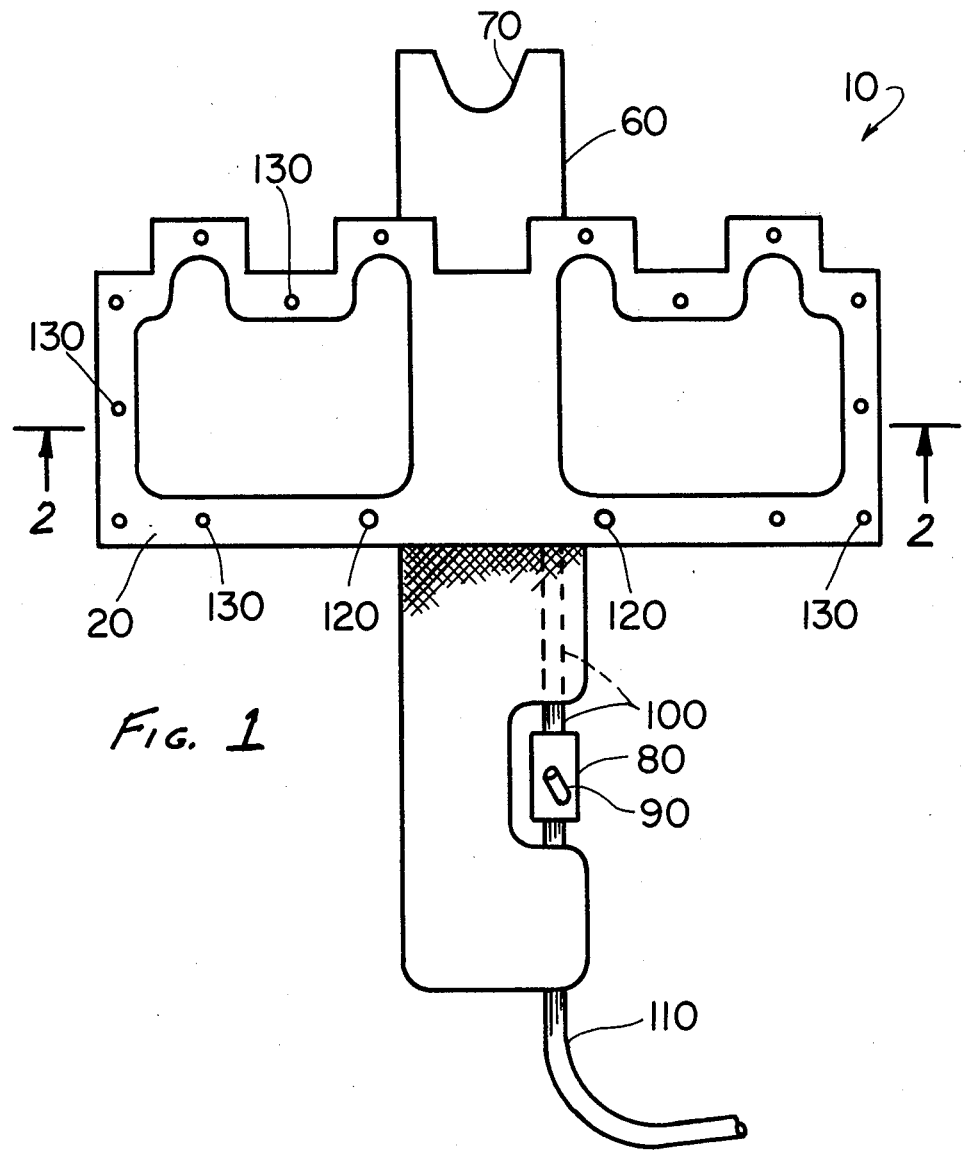
FIG. 1 is a plan view of the apparatus of the invention.
Figure 2:
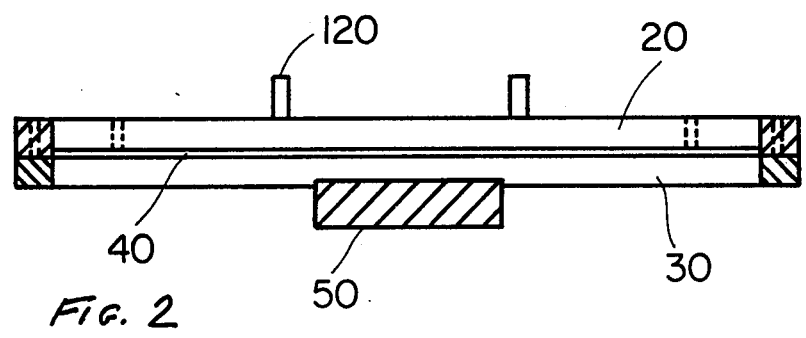
FIG. 2 is a sectional view along the lines 2—2 in FIG. 1.

The apparatus of the invention 10 comprises a vacuum fixture and includes two metal plates 20 and 30 of a size and shape suitable for supporting each of the metal sheets, described above, which are to be welded together. The plates are cut out so that essentially they comprise a frame, and they are suitably hermetically sealed together. The plates are so formed that an air space 40 is provided between them and extending completely around the frame.

A metal handle 50 in the form of a relatively elongated bar or rod is secured to the frame at about its center and extends transversely to the long axis thereof. The leading end 60 of the handle includes a V-shaped notch 70 for a purpose to be described. A valve 80 having a finger-operated switch 90 is secured to the handle and is connected by tubing 100 to the chamber or space 40 between the plates. The valve is also connected by a flexible tube 110 or the like to a vacuum pump.

A plurality of guide pins 120 are secured to the top surface of the plate, and suction holes 130 are provided in the top plate which communicate with the suction chamber 40 between the plates.

Figure 3:
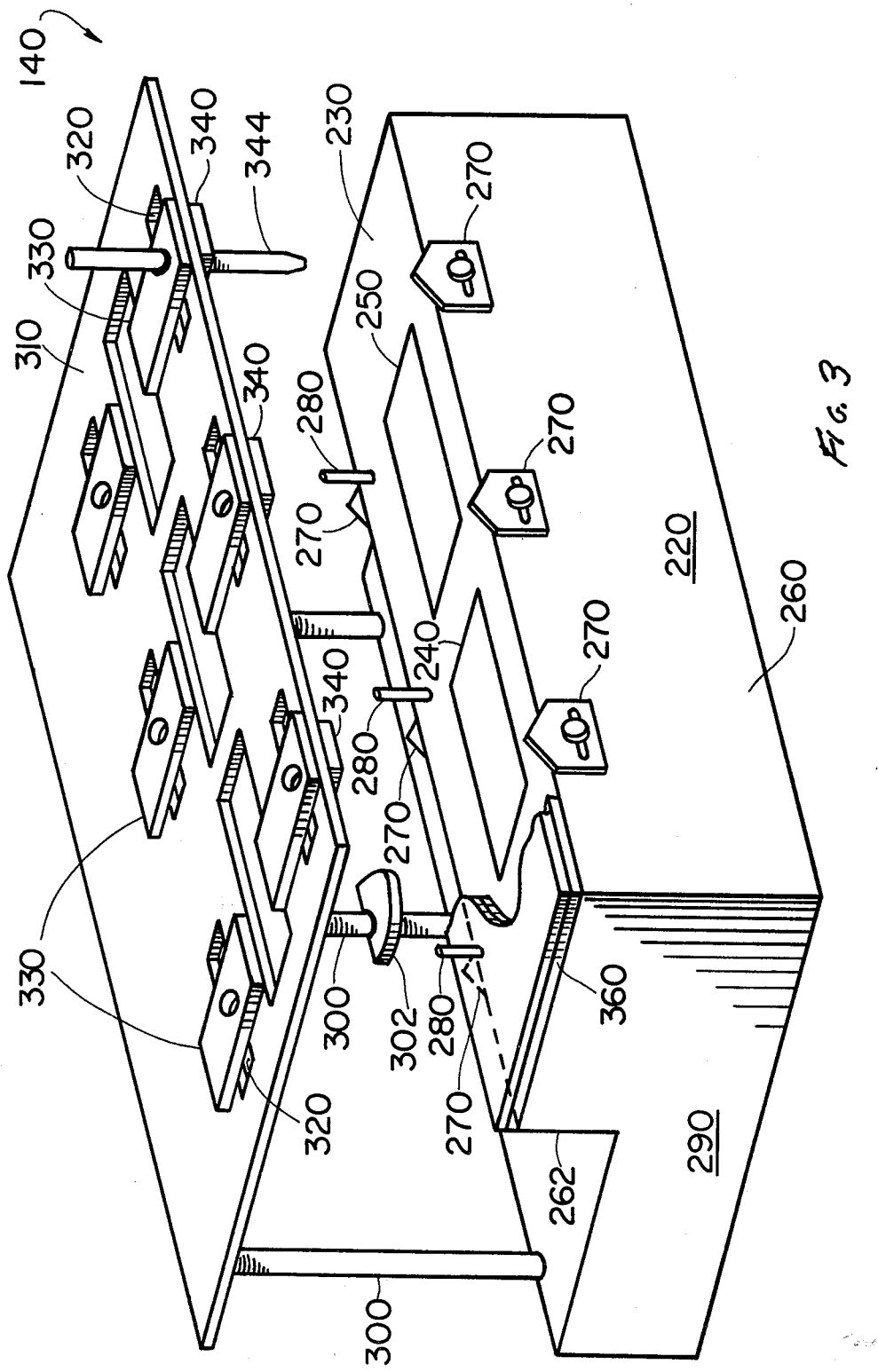
FIG. 3 is a perspective view of auxiliary apparatus with which the invention is used.

The apparatus of the invention is particularly adapted for use with a welding fixture 140 described and claimed in a copending application filed concurrently herewith. The welding fixture, referring to FIG. 3, includes a housing 220 having a top surface 230 in which are disposed two electromagnets 240 and 250. The magnets are generally rectangular in cross-section and are positioned in the housing so that one of their surfaces is coplanar with the top surface of the housing. The housing 220 has front and rear parallel vertical walls 260 and 262, on which are mounted adjustable electrode plates 270 which are operable as counter electrodes for a welding rod. One plate is provided for each welding location to be described below. A plurality of guide pins 280 are provided projecting from the top surface of the housing.

The housing includes a rearwardly projecting portion 290, from which a plurality of metal support rods 300 project vertically. The central rod carries a V-shaped plate 302 for a purpose to be described. A horizontal plate 310 is secured to the upper ends of the vertical rods 300 overlying surface 230 of housing 220 and generally parallel thereto. The plate 310 is provided with, for example, six slots 320, in each of which is slidably and adjustably disposed a bracket 330 having a vertical sleeve 340 for receiving a welding rod 344. Each bracket 330 includes means for locking it in place in its slot 320.

In operation of the vacuum fixture 10, a first metal sheet 360 is seated on the plate 20 with its guide apertures seated on the guide pins 120, and the suction valve 80 is operated to turn on the suction force to draw the metal sheet 360 into intimate engagement with the fixture 10. The fixture is then turned over so that the metal sheet 360 is down and it is inserted into the welding fixture described above until the v-shaped notch 70 engages the plate 302 on central post 300 to provide rough alignment of the parts. The suction is turned off so that the metal sheet 360 is released and seats on the housing of the welding fixture and is centered by pins 280.

The vacuum fixture 10 is then turned over, the second metal sheet is seated thereon and is held in place by the application of suction, and this second sheet is then seated on the first metal sheet on the welding fixture, and the two sheets are then welded together. The vacuum fixture 10 can then be used to grasp the two welded sheets and transfer them to another operating position.

What is claimed is:

1. A vacuum fixture comprising
   a pair of plates hermetically sealed together with a vacuum space between them and with a plurality of suction holes in one plate which provide communication between said vacuum space and the outside world, said one plate being adapted to carry a sheet or body seated thereon and held thereon by suction operating through said suction holes,
   a handle secured to said plates and having guide means at one end thereof,
   tubing carried by said handle and communicating with said vacuum space, and
   a control valve carried by said handle and disposed between said tubing and a suction source.

2. The apparatus defined in claim 1 wherein said one plate carries guide pins for positioning said sheet thereon.

3. The apparatus defined in claim 1 wherein said valve includes a finger-operated switch.

4. The apparatus defined in claim 1 wherein said plates provide an assembly which is generally in the form of a frame, and said suction holes are distributed along the perimeter of the frame.

5. A vacuum fixture comprising
   a pair of plates hermetically sealed together with a vacuum space between them and with a plurality of suction holes in one plate which provide communication between said vacuum space and the outside world, said one plate being adapted to carry a sheet or body seated thereon and held thereon by suction operating through said suction holes,
said pair of plates having a long axis, and
a handle secured to said pair of plates,
said handle having a long axis and being disposed transverse to the long axis of said plates,
said handle having two ends,
said pair of plates being seated on said handle between said ends so that the ends of said handle extend beyond said plates, one end being adapted to be gripped by the user and the other end having a guide portion for engaging apparatus which operates on sheets carried by said plates to provide proper alignment between said apparatus and said pair of plates and the sheets carried thereby.

6. The fixture defined in claim 5 and including tubing carried by said handle and communicating with said vacuum space.

7. The fixture defined in claim 6 and including a control valve carried by said handle and disposed between said tubing and a suction source.

* * * * *